May 28, 1940.    E. W. TURNER    2,202,129
WHEEL BALANCE WEIGHT
Filed Aug. 13, 1938
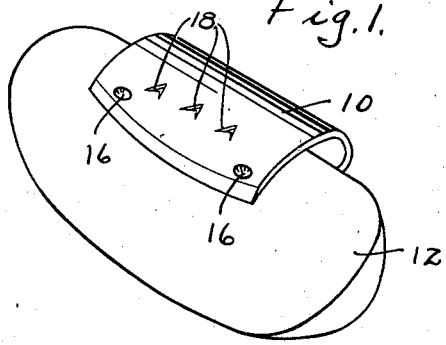
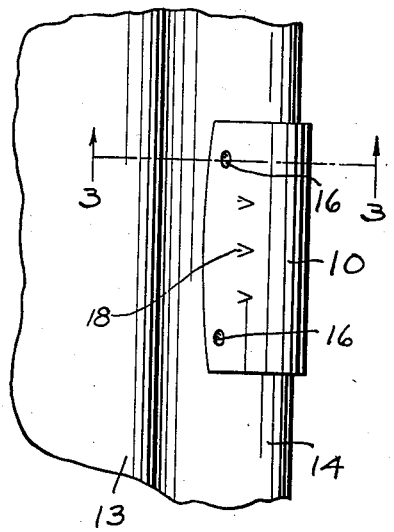
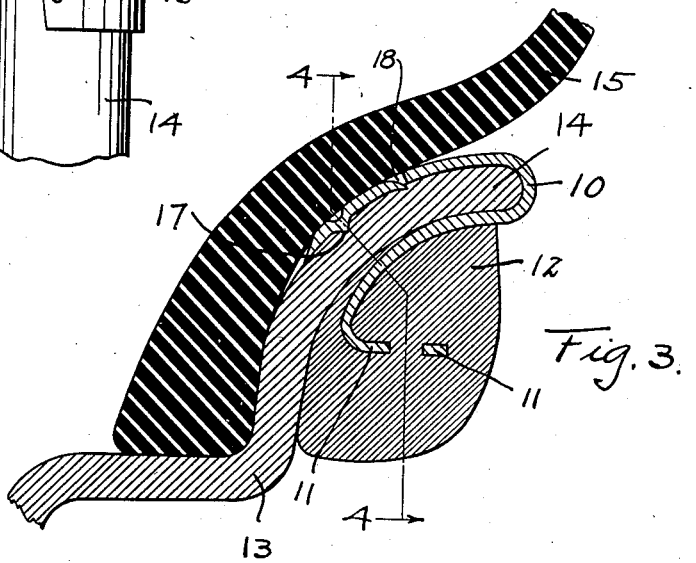
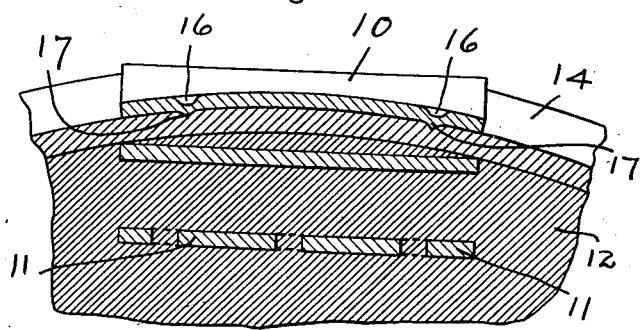
Inventor
Earl W. Turner,
By Minturn & Minturn,
Attorneys Patented May 28, 1940

2,202,129

UNITED STATES PATENT OFFICE 2,202,129

WHEEL BALANCE WEIGHT

Earl W. Turner, Kokomo, Ind., assignor of one-third to himself; one-third to Ellen E. Turner, one-sixth to Earl W. Turner, trustee for John E. Turner, one-sixth to Earl W. Turner, trustee for Helen C. Turner Application August 13, 1938, Serial No. 224,697

2 Claims. (Cl. 301—5)

This invention relates to wheel balancing weights, the purpose of which is to place vehicle wheels, particularly on automobiles and the like, in running balance.

The trend of modern motor car design, plus increased speeds, small wheel diameters, and smooth pavements, make it necessary that wheel assemblies be in perfect balance. A wheel one ounce out of balance may develop a pounding force of approximately twelve pounds at sixty miles an hour. This great force tends to set up a condition commonly termed "tramp" which makes it rather difficult as well as dangerous to control cars having wheels in such unbalanced condition when traveling at the high speeds causing rapid and uneven tire wear.

Reference is made to the U. S. Letters Patent No. 2,029,561 granted to Du Sang February 4, 1936, which shows a wheel balance weight of the type herein referred to.

A primary object of the present invention is to provide positive means for retaining the balance weight positively in position by simply hooking a spring clip over the flange of the tire rim. Traveling at high speeds, it is very necessary to be assured that such balance weights will not fly off the tire rim.

One particular form of the invention is herein shown and described in reference to the accompanying drawing, in which—

Fig. 1 is a top perspective view of a balance weight embodying the invention;

Fig. 2, a top plan view of the weight applied to a rim;

Fig. 3, a transverse section on the line 3—3 in Fig. 2; and

Fig. 4, a longitudinal section on the line 4—4 in Fig. 3.

Like characters of reference indicate like parts throughout the several views in the drawing.

A metal spring clip 10 is formed to be roughly S-shaped, the lower loop of the clip being suitably turned and designated as a foot 11 to be anchored in any suitable manner in a mass of metal 12 of the desired weight. The exact nature of this metal 12 is not a critical part of the invention, although it is desirable to employ one of the "heavy" metals such as lead or an alloy or mixture containing a considerable proportion of lead, zinc, or die cast metal in order that the weight may be concentrated within a relatively small volume.

In the present form of the invention illustrated, this metal 12 is formed, molded or die-cast about the foot 11 which is provided in the present form with a number of openings through which the metal may be flowed to secure good anchorage on the foot. The metal 12 is shaped to conform to the under side of the tire rim 13 along the underneath portion of the outwardly turned flange. The upper loop of the clip 10 is formed to fit around the flange 14, as indicated in Fig. 3, and the free end is carried down on the inner side of the flange 14 a sufficient distance as will permit the tire casing 15 to bear thereagainst and tend to force the clip into compressive contact with the tire rim flange 14.

This clip 10, in one form of production, is made from a flat strip of steel by progressive operations through a punch and forming press. One of the operations consists in punching the clip to form one or more depressions 16 in a manner which will force the metal from the other side downwardly into sharp conical detents 17, suitable dies being formed to shape the detents. After the clip is finally formed, it is tempered to give it the desired resiliency as well as hardness, and, therefore, these detents being relatively small and extending but a slight distance from the surface of the clip become quite hard, at least being considerably harder than the tire rim flange.

The balance weight is applied to the tire rim 13 by hooking the open part of the clip over the flange 14 and then driving it thereover to seat it against the lip of the flange to the position as indicated in Fig. 3. The detents 17 will bite into the metal of the rim and finally become seated therein under the influence of the pressure exerted by the tire casing 15 continually pushing against the clip.

The clip 10 is further formed, as indicated in Fig. 4, to have the free end curved longitudinally and transversely to meet the curvature of the tire rim flange 14 so as to bring that part of the clip carrying the detents 17 around into close alignment and contact with the inside of the tire rim flange 14. The clip, of course, has to be bent along straight lines in forming the outer loop which engages the lip of the flange 14, but the free end of the clip is formed, as indicated in Fig. 4, to follow the contour of the rim flange.

The form of the invention as above described has been extremely successful in actual commercial usage and has solved a problem which has heretofore not been met. It has been the practice heretofore when using means to secure the balance weights in position to employ set screws but set screws may work loose, or, which is worse, tend to pry the weights outwardly away from the rim. The present invention overcomes these difficulties and provides an extremely simple, inexpensive, and positive means for retaining the balance weights in position on the tire rims. It is to be noted that the drawing shows the invention on an enlarged scale in order to better display the various elements of the weight. In practice the depressions 16 are quite small in diameter and are approximately $\frac{1}{32}$ inch in diameter so as to limit the detents to a small diameter and corresponding extension.

The detents 17 are preferably used, one near each outer corner of the free end of the clip, as indicated in Fig. 1, and the clip end is further beveled so as to eliminate any tendency of the tire casing 15 to lift or push the clip outwardly. On small sized clips, one detent centrally located is sufficient.

While the description above given has referred to the use of the detents 17, it is also within the scope of the invention to employ barbs 18 pressed out of the clip before hardening, as indicated in Figs. 1–3. These barbs may be used alone or in conjunction with the detents and the number of barbs used will depend upon the width of the clip 10 which in turn depends upon the size of the weight employed. It is to be understood, of course, that balance weights of the type herein indicated are made in a range of individual weights so as to take care of the particular degree of unbalance encountered.

While I have herein shown and described my invention in the one best form as now known to me, it is obvious that structural variations may be employed without departing from the spirit of the invention, and I, therefore, do not desire to be limited to that precise form beyond the limitations as may be imposed by the following claims.

I claim:

1. In a wheel balance weight for engagement over the edge of a tire rim, the combination of a weight, a spring clip carrying the weight up against the outside of the rim and extending over the lip of the rim down inside thereof in yielding compressive engagement with both sides of the rim, the free end of the clip on the inside of the rim being curved longitudinally and transversely to conform to the rim curvature, said clip having a member near each corner of said end extending integrally from the clip against the rim, said member being shaped to bite into the rim under pressure exerted by the clip and further aided by pressure against the clip exerted by the tire carried by the rim.

2. In a wheel balance weight for engagement over the edge of a tire rim, the combination of a weight, a spring clip carrying the weight up against the outside of the rim and extending over the edge of the rim down inside thereof in yielding compressive engagement with the rim, the free end of the clip on the inside of the rim being curved both longitudinally and transversely to conform closely to the rim curvature, and a substantially conical member extending integrally and normally from said clip near each corner of said end to bite into the material of the rim under pressure exerted both by the clip and by the tire carried by the rim.

EARL W. TURNER.